US008726682B1

(12) United States Patent  
Olson

(10) Patent No.: US 8,726,682 B1  
(45) Date of Patent: May 20, 2014

(54) HYBRID MULTI-MODE HEAT PUMP SYSTEM

(71) Applicant: Gaylord Olson, Princeton, NJ (US)

(72) Inventor: Gaylord Olson, Princeton, NJ (US)

( * ) Notice: Subject to any disclaimer, the term of this patent is extended or adjusted under 35 U.S.C. 154(b) by 0 days.

(21) Appl. No.: 14/058,236

(22) Filed: Oct. 19, 2013

Related U.S. Application Data

(63) Continuation-in-part of application No. 13/425,414, filed on Mar. 20, 2012.

(60) Provisional application No. 61/795,641, filed on Oct. 20, 2012.

(51) Int. Cl.  
*F25B 25/00* (2006.01)

(52) U.S. Cl.  
USPC .......................................... 62/260; 62/235.1

(58) Field of Classification Search  
USPC ........................................ 62/260, 235.1, 179  
See application file for complete search history.

(56) References Cited

U.S. PATENT DOCUMENTS

| | | | | |
|---|---|---|---|---|
| 3,007,680 A * | 11/1961 | Harris | ........................... | 165/150 |
| 3,782,132 A * | 1/1974 | Lohoff | ............................. | 62/260 |
| 4,012,920 A * | 3/1977 | Kirschbaum | ................. | 62/235.1 |
| 2007/0044494 A1* | 3/2007 | Ally et al. | ......................... | 62/260 |
| 2011/0203576 A1* | 8/2011 | Thoma | ............................ | 126/631 |
| 2012/0125020 A1* | 5/2012 | Vandermeulen et al. | ......... | 62/94 |

* cited by examiner

*Primary Examiner* — Cassey D Bauer  
(74) *Attorney, Agent, or Firm* — LaMorte & Associates, P.C.

(57) ABSTRACT

A hybrid multi-source system that is used to heat or cool a building. The system utilizes a heat pump or similar HVAC unit. A solar/air heat exchanger is provided. At least one ground heat exchanger is utilized. A plumbing network interconnects the heat pump, the solar/air heat exchanger, and the ground heat exchanger. A heat transfer fluid circulates through the plumbing network. Temperature sensors are used to monitor temperatures of the heat transfer fluid at multiple points in the system. At least one pump circulates the heat transfer fluid through the plumbing network. Valves are disposed within the plumbing network that can selectively isolate the heat pump, the solar/air heat exchanger, and the ground heat exchanger. A systems controller is coupled to the temperature sensors, the valves, and pump. The system operates in multiple modes which allow for higher efficiency and long term underground thermal storage.

11 Claims, 15 Drawing Sheets

US 8,726,682 B1

HYBRID MULTI-MODE HEAT PUMP SYSTEM

RELATED APPLICATIONS

This application claims priority of U.S. Provisional Patent Application No. 61/795,641, filed Oct. 20, 2012.

This application is a continuation-in-part of co-pending U.S. patent application Ser. No. 13/425,414 filed Mar. 20, 2012.

BACKGROUND OF THE INVENTION

1. Field of the Invention

In general, the present invention relates to heat pump systems that exchange heat with solar thermal collectors, ambient air and the earth. More particularly, the present invention relates to the operational configurations of such systems that enable such systems to run in a highly efficient manner.

2. Prior Art Description

Many homes, offices and other buildings utilize heat pump systems to help heat and/or cool the building. Ground source heat pumps utilize the ground under or near the building either as a heat source or as a heat sink. Air source heat pumps utilize the ambient atmosphere either as a heat source or as a heat sink. By using the earth or atmosphere as a heat source/heat sink, energy can be conserved. Consequently, heat pump systems provide an economical solution to many heating and cooling needs.

Prior art ground source heat pump systems typically operate in one of only two possible modes. Either they operate in a heating mode where heat is transferred to the environment of a building from the ground, or they operate in a cooling mode where heat is transferred away from a building environment into the ground. Furthermore, the ability to operate efficiently in either of these modes depends largely upon the temperature differential between the building environment and the ground temperature.

The present invention presents a heat pump system that can operate in multiple heating and cooling modes while combining the best features of both ground source heat pumps and air source heat pumps. Furthermore, the selection of the operating mode is automatically controlled in order to optimize efficiency, depending upon environmental conditions and system needs. This enables the heat pump system to operate much more efficiently than prior art systems. The present invention heat pump system also enables the heat pump to operate with other HVAC equipment, such as solar thermal panels, therein making the heat pump system more versatile and cost effective.

The details of the present invention heat pump system are described and claimed below.

SUMMARY OF THE INVENTION

The present invention is a hybrid multi-source heat pump system that is used to heat or cool a building. The system utilizes a heat pump, HVAC unit or similar internal system. An above-ground solar/air heat exchanger is provided. A ground heat exchanger is also utilized. A plumbing network hydraulically interconnects the heat pump, the solar/air heat exchanger, and the ground heat exchanger. A heat transfer fluid circulates through the plumbing network.

Temperature sensors are used to monitor temperatures of the heat transfer fluid in the heat pump, the solar/air heat exchanger, and the ground heat exchanger. At least one pump circulates the heat transfer fluid through the plumbing network. Valves are disposed within the plumbing network that can selectively isolate and interconnect the heat pump, the solar/air heat exchanger, and the ground heat exchanger.

A systems controller is coupled to the temperature sensors, the valves, and pump. The systems controller operates in multiple modes of operation. The multiple modes of operation include a first mode where the solar/air heat exchanger is isolated and the heat transfer fluid circulates only between the heat pump and the ground heat exchanger. In a second mode of operation, the ground heat exchanger is isolated and the heat transfer fluid circulates only between the solar/air heat exchanger and the heat pump. In a third mode of operation, the heat transfer fluid circulates between the solar/air heat exchanger, the ground heat exchanger, and the heat pump. In a fourth mode of operation, the heat pump is isolated and the heat transfer fluid circulates only between the solar/air heat exchanger and the ground heat exchanger.

By operating in these different modes at different times and during different environmental conditions, a high energy efficiency can be obtained.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention hybrid multi-source heat pump system can be embodied in many ways, the embodiments illustrated show only some exemplary systems and a handful of different modes of operation. These embodiments are selected in order to set forth the best modes contemplated for the invention. The illustrated embodiments, however, are merely exemplary and should not be considered a limitation when interpreting the scope of the appended claims.

Figure 1:
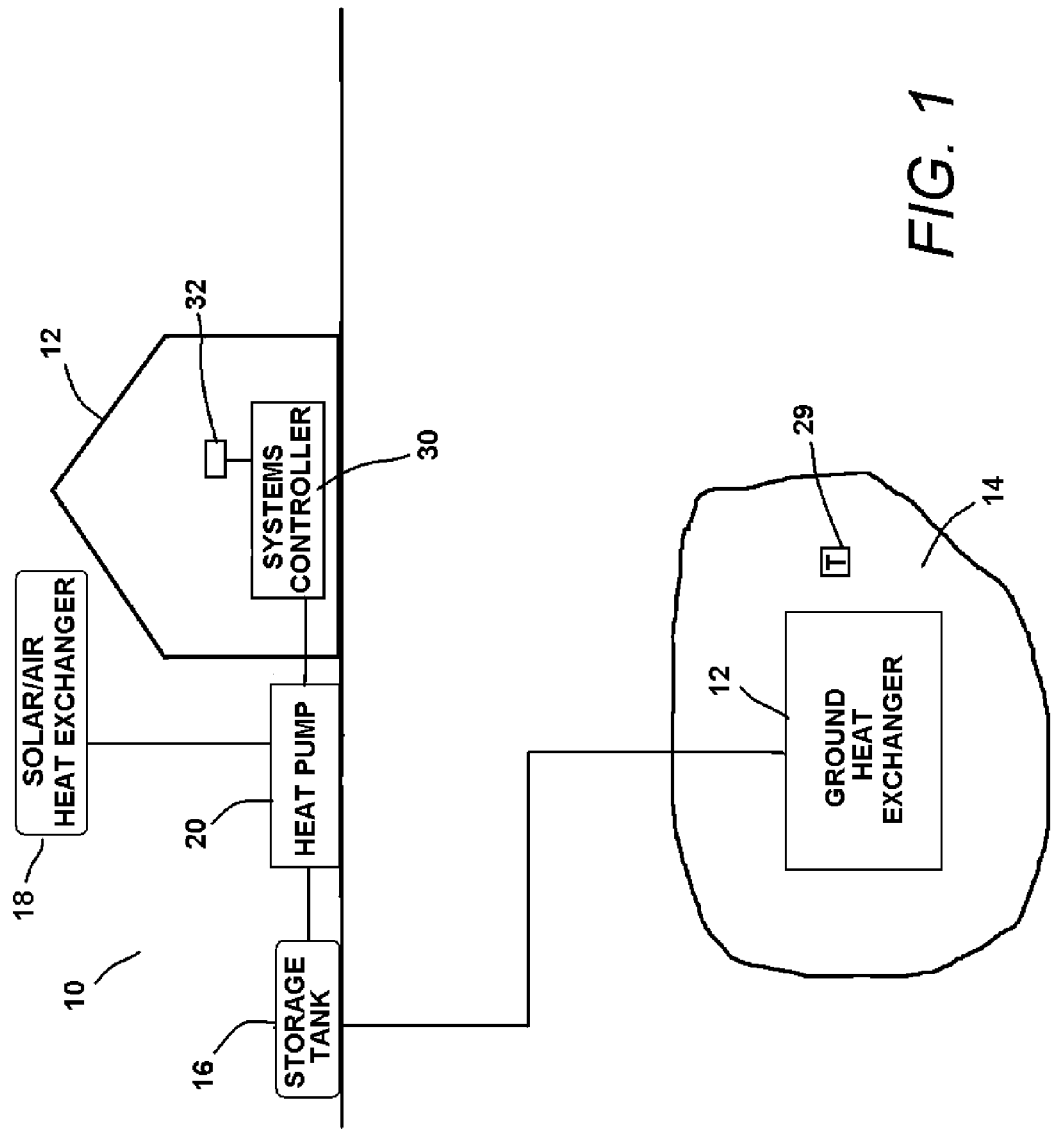
FIG. 1 is a schematic of an exemplary embodiment of the present invention hybrid multi-source heat pump system, showing primary system components.
Figure 2:
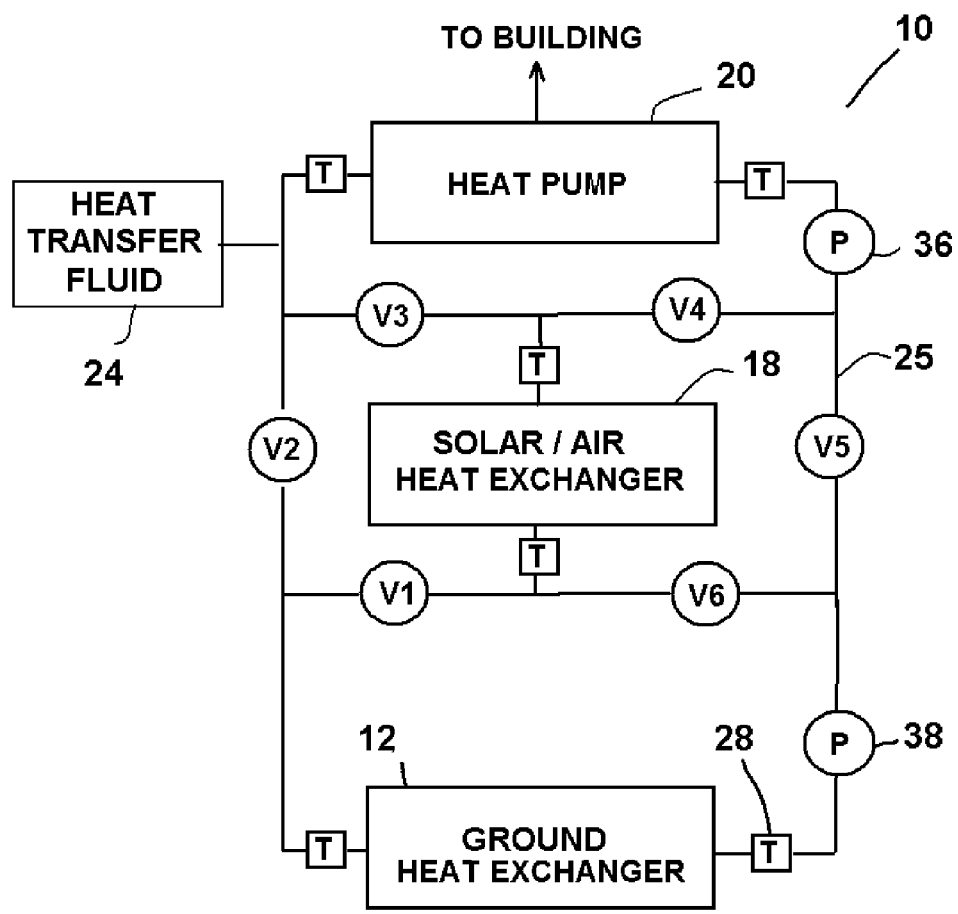
FIG. 2 is a schematic of the exemplary embodiment showing the systems that control the flow of a heat transfer fluid between the various system components.

Referring to FIG. 1 in conjunction with FIG. 2, a hybrid multi-source heat pump system 10 is shown for use in heating and cooling a building 12. The building 12 can be residential, commercial, or institutional. Furthermore, the hybrid multi-source heat pump system 10 can be used to heat, and/or cool a compound of multiple buildings. A single building 12 is illustrated for the sake of simplicity.

The hybrid multi-source heat pump system 10 utilizes at least one heat storage area 14. Heat is exchanged with heat storage area 14 using a ground heat exchanger 12. In the embodiment of FIG. 1, the heat storage area 14 is illustrated as a mass of subterranean earth. However, other storage mediums can be used. The use of the earth as the heat storage area is merely exemplary. If a body of water is available, such as a nearby pond, then that body of water may be used as a heat storage area. Other heat storage and heat exchanger types include, but are not limited to, insulated water containers, ice house heat sinks, cooling towers and the like. What is important is that heat can be both added to and drawn from the heat storage area 14 in an efficient manner.

Heat is added to, and drawn from, the heat storage area 14 using the ground heat exchanger 12. The ground heat exchanger 12 is part of a larger plumbing network 25 that circulates a heat transfer fluid 24, such as a water/propylene-glycol (antifreeze) solution. The ground heat exchanger 12 is coupled to an optional storage container 16. The storage container 16 is highly thermally insulated. The storage container 16 holds large volumes of heat transfer fluid, water or phase change material.

At least one solar/air heat exchanger 18 is provided. The solar/air heat exchanger 18 is an above-ground heat exchanger that is capable of absorbing heat from the sun and/or warm air. The solar/air heat exchanger 18 is also capable of radiating and convecting heat into a cold night. The solar/air heat exchanger 30 preferably includes at least one thermal panel and/or air radiator. The thermal panels can be glazed or unglazed. Although the unglazed panels do not collect heat as well as glazed panels in cold environments, their other advantages are more significant. Unglazed panels cost much less than glazed panels per unit area. In addition to collecting solar thermal energy, unglazed panels also can serve as air radiators by radiating and convecting heat into ambient air. If solar thermal collection is not needed, a fin-and-tube heat exchanger could be used.

The solar/air heat exchanger 18 is also connected to the plumbing network 25, wherein the solar/air heat exchanger 18 is capable of heating or cooling the heat transfer fluid 24 flowing within the plumbing network 25.

The building 12 is provided with a conventional water source heat pump HVAC system. The heat pump 20 is coupled to the plumbing network 25. The heat pump 20 emits heat to, or absorbs heat from, the heat transfer fluid 24 depending upon the operational settings of the heat pump 20. The heat pump 30 can operate to either heat or cool the building 12. When heating the building 12, the heat pump 20 emits heat into the building 12. The heat is supplied by the heat transfer fluid 24 circulating through the plumbing network 25. Conversely, when cooling the building 12, the heat pump 20 absorbs heat from the building 12 and transfers that heat to the heat transfer fluid 24.

The operation of the heat pump 32 is controlled by a systems controller 30. A person in the building 12 accesses the systems controller 30 using a thermostat or similar HVAC interface 32.

The temperature of the heat transfer fluid 24 at various points throughout the plumbing network 25 is monitored by a plurality of fluid temperature sensors 28. The fluid temperature sensors 28 monitor the temperature of the heat exchange fluid 24 entering and exiting the heat pump 20, entering and exiting the solar/air heat exchanger 18, and entering and exiting the ground heat exchanger 12. The fluid temperature sensors 28 read the temperature data to the systems controller 30. Furthermore, the temperature data from a ground temperature sensor 29 is also read to the systems controller 30. The ground temperature sensor 29 monitors the temperature of the earth surrounding the ground heat exchanger 12.

The earth thermal energy conversion system 10 has several modes of operation. The modes of operation are controlled by the selective activation and deactivation of multiple valves and pumps that direct flow through various pathways within the plumbing network 25. The various valves and pumps are controlled by the systems controller 30.

The pumps include a heat pump circulation pump 36, and a general circulation pump 38. The valves are identified in FIG. 2 as valves No. 1 through valve No. 6. The six valves are arranged to selectively control the flow of the heat transfer fluid 24 through the heat pump 20, solar/air heat exchanger 18 and ground heat exchanger 12.

Operating Modes

Figure 3:
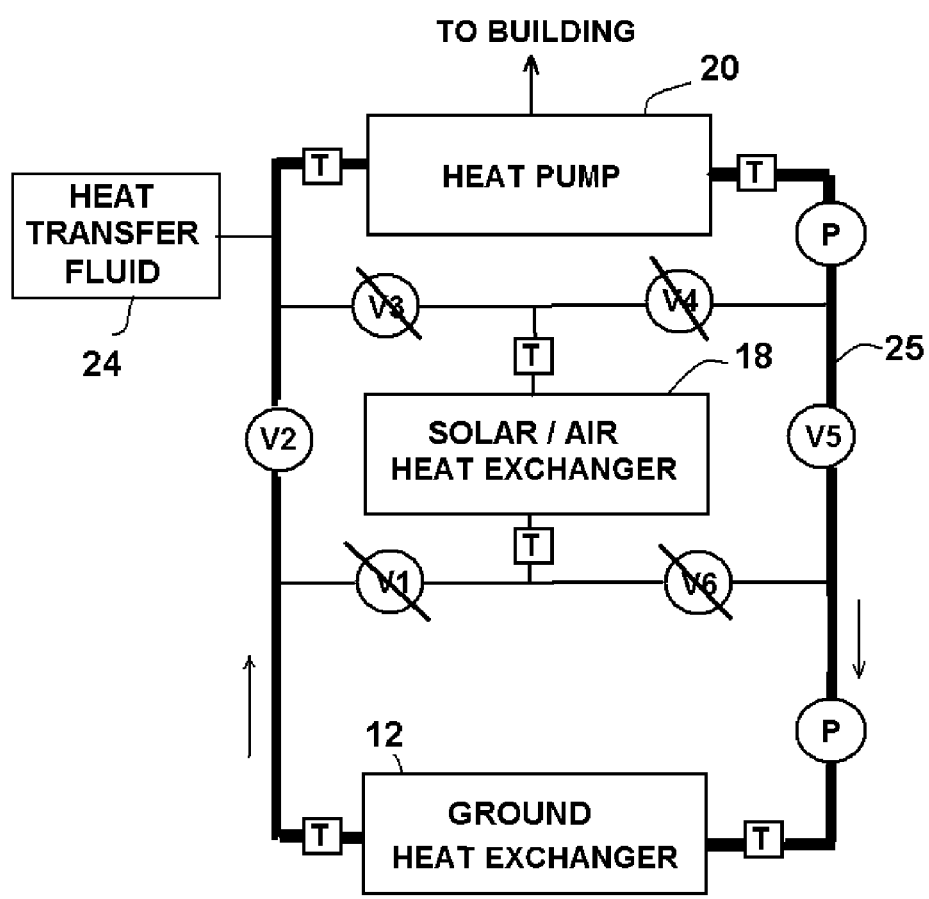
FIG. 3 is a schematic of the exemplary embodiment of FIG. 2 highlighting the flow path of the heat transfer fluid in a first operating mode.

Referring to FIG. 3 in conjunction with FIG. 1, a first mode of operation is explained. In this mode of operation, the solar/air heat exchanger 18 is isolated by closing V1, V3, V4 and V6. The plumbing network 25 therefore circulates heat transfer fluid 24 between the heat pump 20 and the ground heat exchanger 12. During the summer, the ground heat exchanger 12 can be used to remove heat from the heat transfer fluid 24. In the winter, the ground heat exchanger 12 can add heat to the heat transfer fluid 24. Thus, the heat pump 20 can operate in either a basic heating mode or a basic air conditioning mode.

Figure 4:
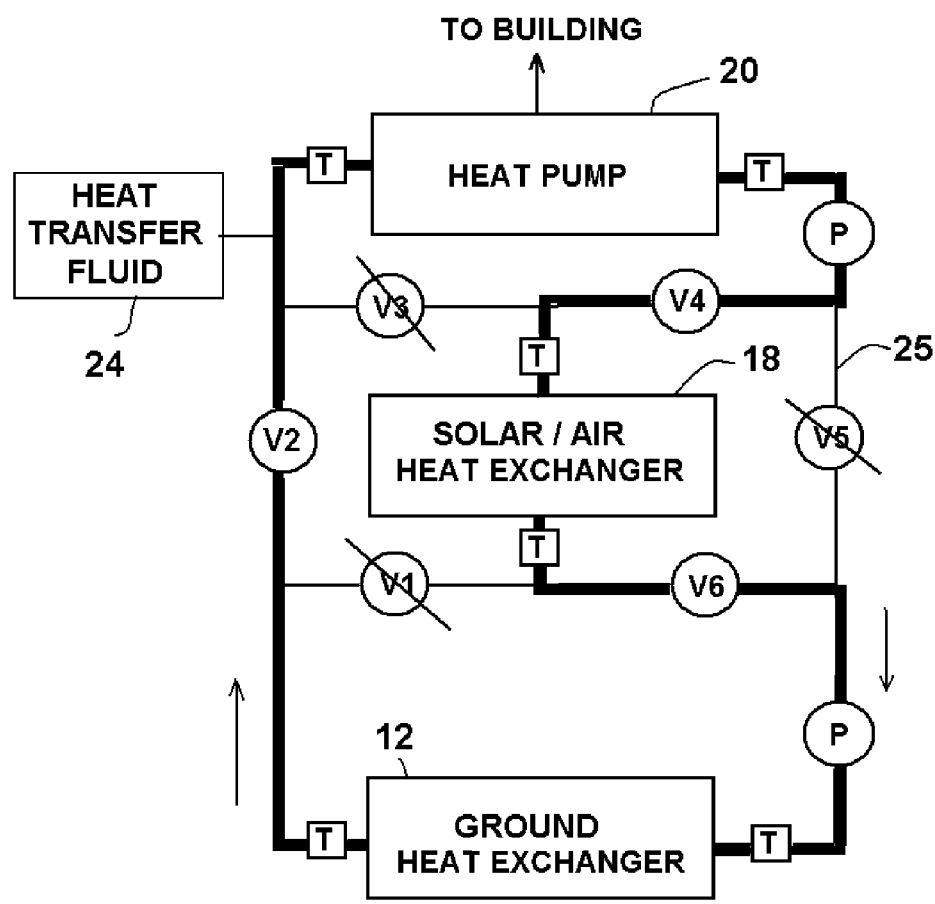
FIG. 4 is a schematic of the exemplary embodiment of FIG. 2 highlighting the flow path of the heat transfer fluid in a second operating mode.

Referring to FIG. 4 in conjunction with FIG. 1, a second mode of operation is explained. This second mode of operation is used when it is desired to heat the building 12 with the heat pump 20 and the systems controller 30 recognizes that both the solar/air heat exchanger 18 and the ground heat exchanger 12 have outputs that are warmer than the temperature exiting from the heat pump 20. This mode of operation also requires that the temperature of the solar/air heat exchanger 18 be no hotter than the temperature of the ground heat exchanger 12.

In this second mode of operation, valves V1, V3 and V5 are closed. This causes the plumbing network 25 to direct the heat transfer fluid 24 into the top of the solar/air heat exchanger 18. The heat transfer fluid 24 flows through the solar/air heat exchanger 18 where it is preheated. The preheated heat transfer fluid then flows through the ground heat exchanger 12, where it is further heated. The hot fluid transfer fluid 24 then circulates to the heat pump 20 where the heat is used to heat the building 12.

Figure 5:
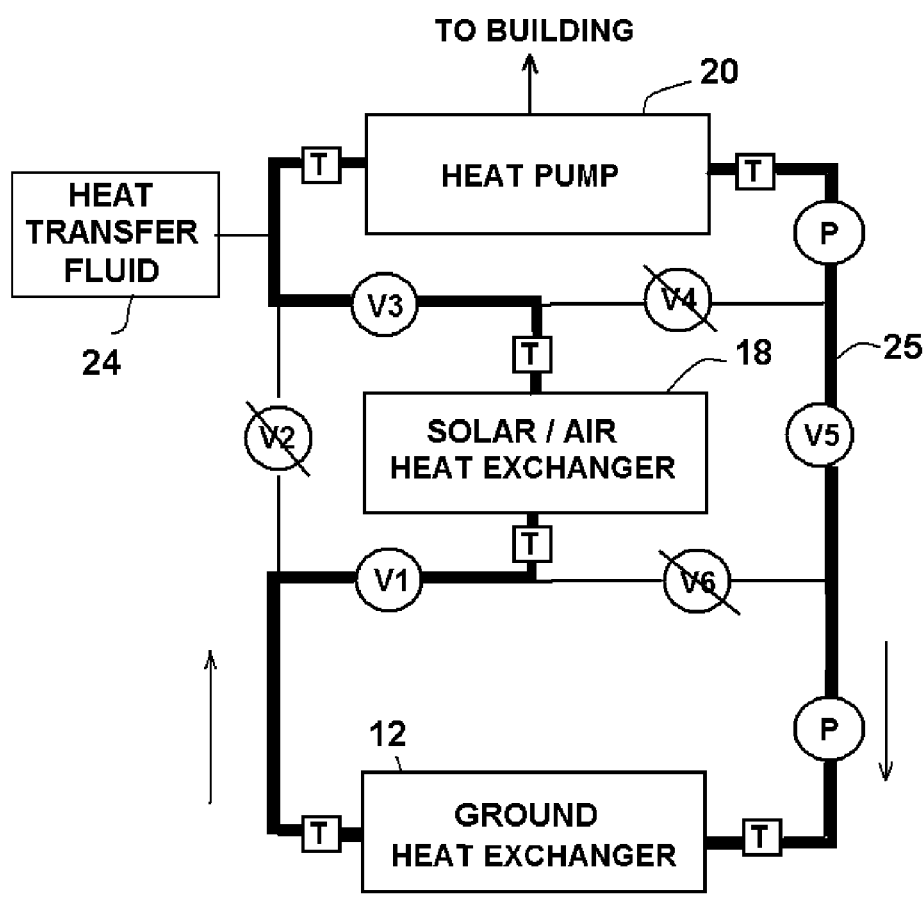
FIG. 5 is a schematic of the exemplary embodiment of FIG. 2 highlighting the flow path of the heat transfer fluid in a third operating mode.

Referring to FIG. 5 in conjunction with FIG. 1, a third mode of operation is explained. This third mode of operation is used when it is desired to heat the building 12 with the heat pump 20 and the systems controller 30 recognizes that both the solar/air heat exchanger 18 and the ground heat exchanger 12 have outputs that are warmer than the temperature exiting the heat pump 20. This mode of operation also requires that the temperature of the solar/air heat exchanger 18 is at least as hot as the temperature of the ground heat exchanger 12.

In this mode of operation, valves V2, V4, and V6 are closed. This causes the plumbing network 25 to direct the heat transfer fluid 24 through the ground heat exchanger 12 and to the bottom of the solar/air heat exchanger 18. The heat transfer fluid 24 flows through the ground heat exchanger 12 where it is preheated. The preheated heat transfer fluid then flows through the solar/air heat exchanger 18, where it is further heated. The hot fluid transfer fluid 24 then circulates to the heat pump 20 where the heat is used to heat the building 12.

Figure 6:
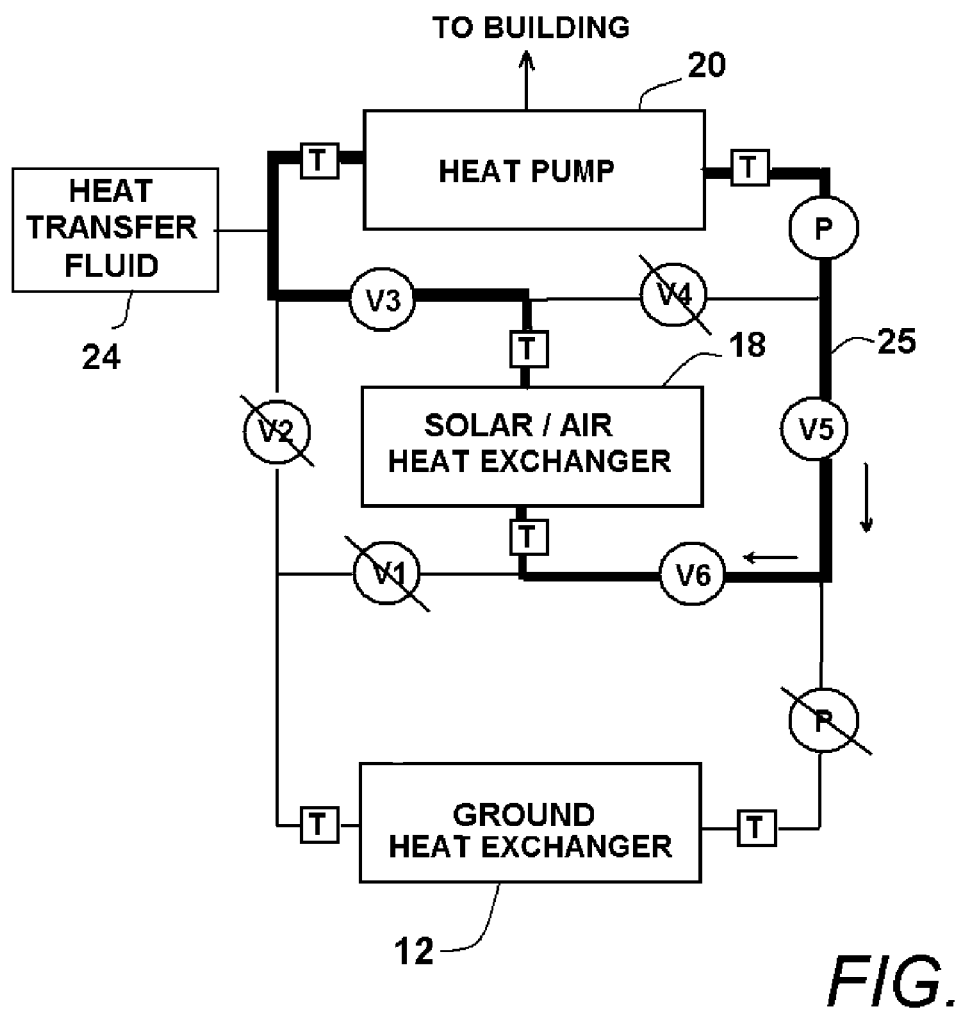
FIG. 6 is a schematic of the exemplary embodiment of FIG. 2 highlighting the flow path of the heat transfer fluid in a fourth operating mode.

Referring to FIG. 6 in conjunction with FIG. 1, a fourth mode of operation is explained. This fourth mode of operation is used when it is desired to heat the building 12 with the heat pump 20 and the systems controller 30 recognizes that the ground heat exchanger 12 has an output that is colder than the temperature from the heat pump 20.

In this mode of operation, valves V1, V2 and V4 are closed. This causes the plumbing network to direct the heat transfer fluid 24 only through the solar/air heat exchanger 18. The heat transfer fluid 24 exits the solar/air heat exchanger 18 through its top, or hot end. The hot fluid transfer fluid 24 then circulates to the heat pump 20 where the heat is used to heat the building 12.

Figure 7:
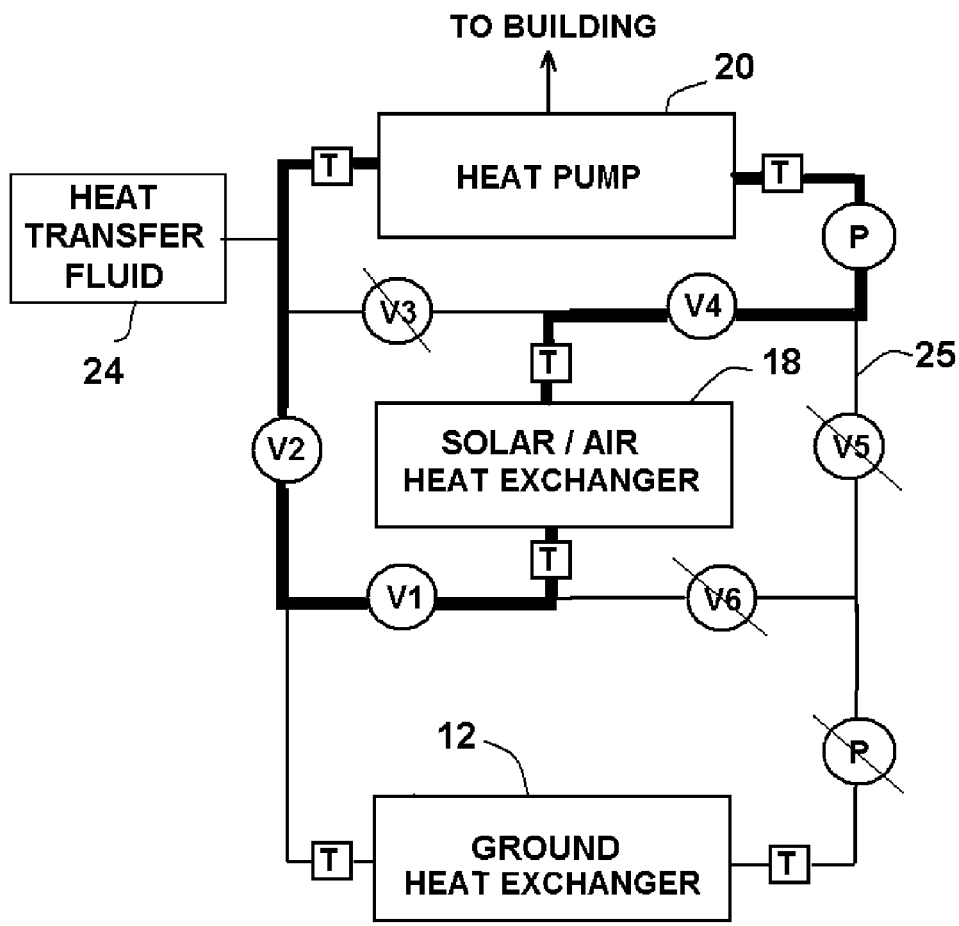
FIG. 7 is a schematic of the exemplary embodiment of FIG. 2 highlighting the flow path of the heat transfer fluid in a fifth operating mode.

Referring to FIG. 7 in conjunction with FIG. 1, a fifth mode of operation is explained. This fifth mode of operation is used when it is desired to cool the building 12 with the heat pump 20 and the systems controller 30 recognizes that the ground heat exchanger 12 has an output that is warmer than the temperature from the heat pump 20.

In this mode of operation, valves V3, V5 and V6 are closed. This causes the plumbing network 25 to direct the heat transfer fluid 24 only through the solar/air heat exchanger 18. The heat transfer fluid 24 enters the solar/air heat exchanger 18 through its top, or warm end. The cooled transfer fluid 24 then circulates to the heat pump 20 where the cold fluid is used to cool the building 12.

Figure 8:
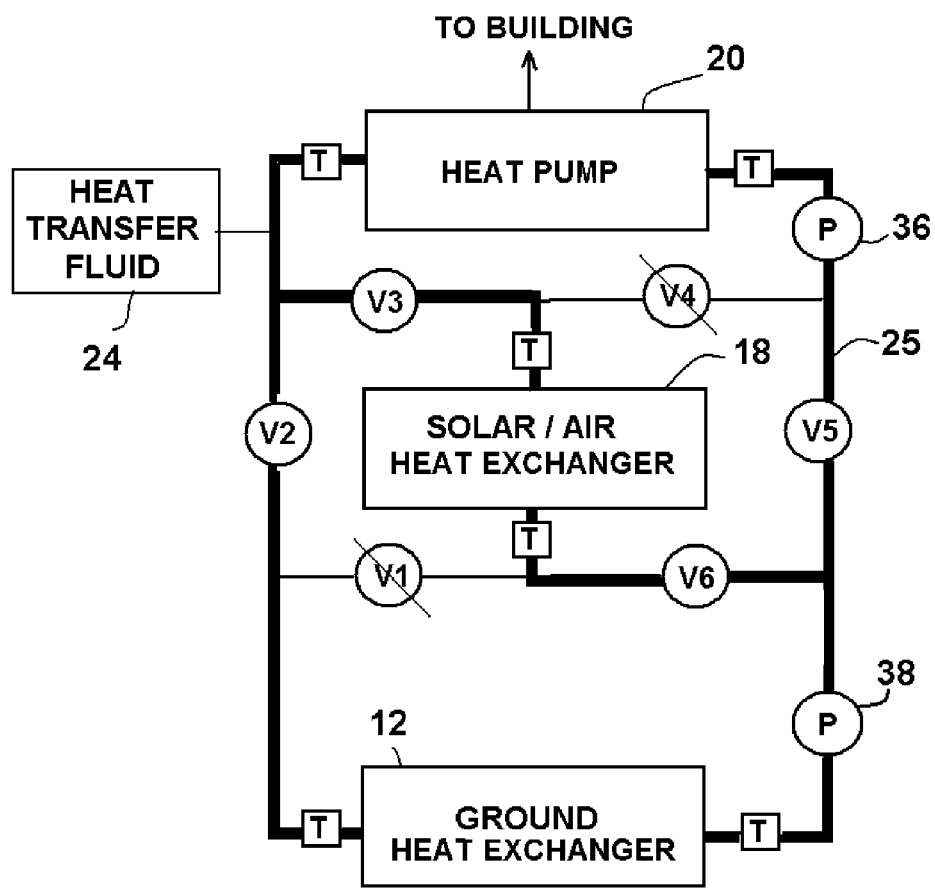
FIG. 8 is a schematic of the exemplary embodiment of FIG. 2 highlighting the flow path of the heat transfer fluid in a sixth operating mode.

Referring to FIG. 8 in conjunction with FIG. 1, a sixth mode of operation is explained. This sixth mode of operation is used when it is desired to heat the building 12 with the heat pump 20 and the systems controller 30 recognizes that both the solar/air heat exchanger 18 and the ground heat exchanger 12 have outputs that are nearly equal in temperature.

In this mode of operation, valves V1 and V4 are closed. This causes the plumbing network 25 to direct the heat transfer fluid 24 through both the solar/air heat exchanger 18 and the ground heat exchanger 12. The flow rates through the solar/air heat exchanger 18 and the ground heat exchanger 12 can be controlled by selectively varying the pump speeds of the heat pump circulation pump 36 and the general circulation pump 38. The heat transfer fluid 24 enters the solar/air heat exchanger 18 through its bottom, or cold end. The output of both the solar/air heat exchanger 18 and the ground heat exchanger 12 are recombined within the plumbing network 25. The heat transfer fluid 24 then circulates to the heat pump 20 where the heat is used to heat the building 12.

Figure 9:
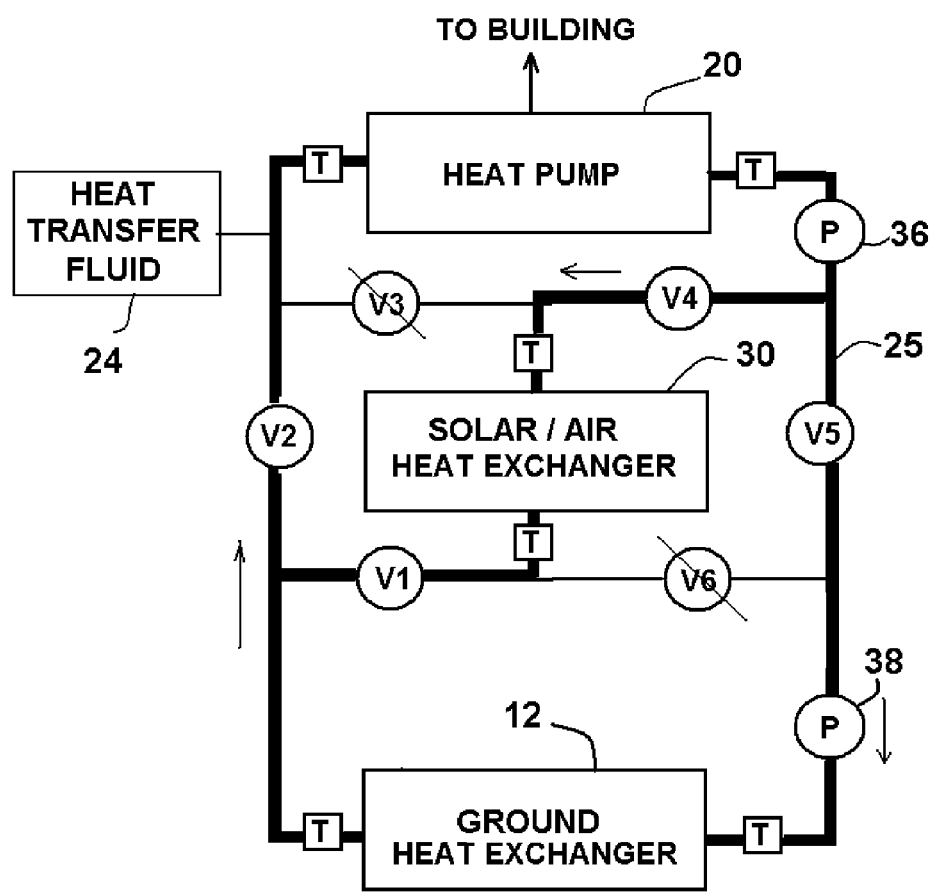
FIG. 9 is a schematic of the exemplary embodiment of FIG. 2 highlighting the flow path of the heat transfer fluid in a seventh operating mode.

Referring to FIG. 9 in conjunction with FIG. 1, a seventh mode of operation is explained. This seventh mode of operation is used when it is desired to cool the building 12 with the heat pump 20 and the systems controller 30 recognizes that both the solar/air heat exchanger 18 and the ground heat exchanger 12 have outputs that are nearly equal in temperature.

In this mode of operation, valves V3 and V6 are closed. This causes the plumbing network to direct the heat transfer fluid 24 through both the solar/air heat exchanger 18 and the ground heat exchanger 12. The flow rates through the solar/air heat exchanger 18 and the ground heat exchanger 12 can be controlled by selectively varying the pump speeds of the heat pump circulation pump 36 and the general circulation pump 38. The heat transfer fluid 24 enters the solar/air heat exchanger 18 through its top, or warm end. The cooled output of both the solar/air heat exchanger 18 and the ground heat exchanger 12 are recombined within the plumbing network 25. The heat transfer fluid 24 then circulates to the heat pump 20 where the cold fluid is used to cool the building 12.

Figure 10:
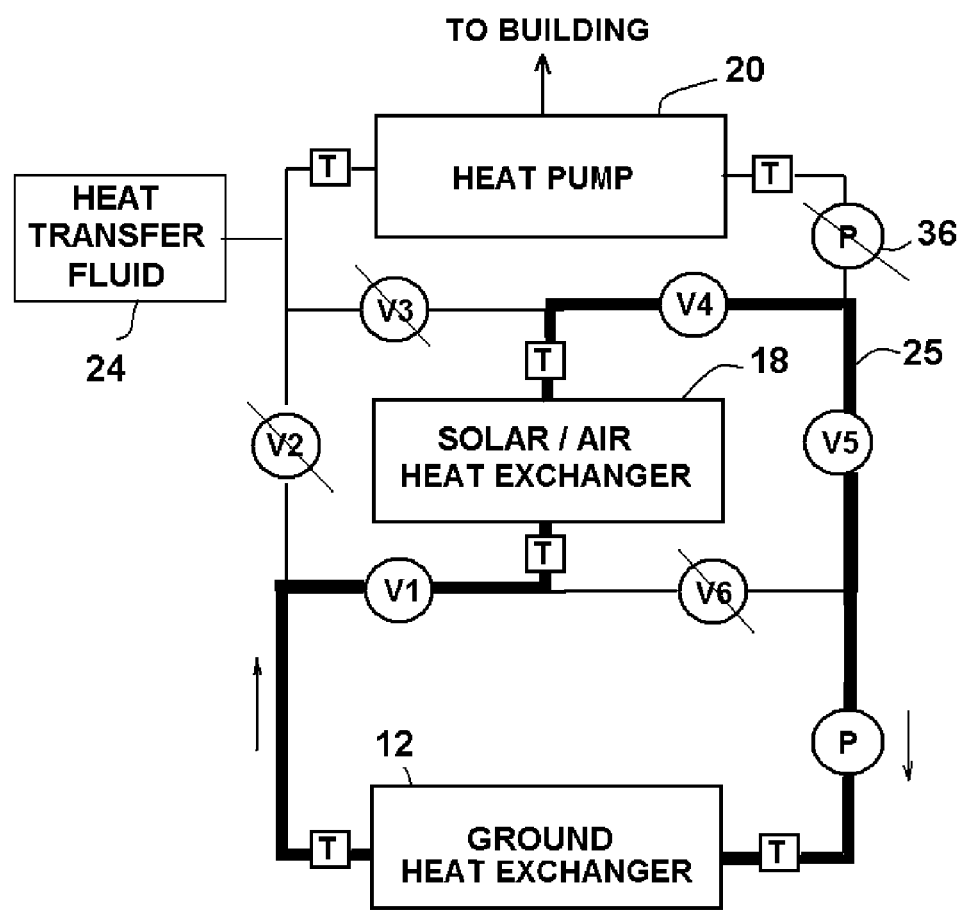
FIG. 10 is a schematic of the exemplary embodiment of FIG. 2 highlighting the flow path of the heat transfer fluid in an eighth operating mode.

Referring to FIG. 10 in conjunction with FIG. 1, an eighth mode of operation is explained. This eighth mode of operation is used when it is desired to add heat to the ground heat exchanger 12 so that the ground heat exchanger 12 transfers the heat into the surrounding ground for storage. This mode is used when the heat pump 20 is not needed and the systems controller 30 recognizes that the solar/air heat exchanger 18 is hotter than the ground heat exchanger 12.

In this mode of operation, valves V2, V3 and V6 are closed. Furthermore, the heat pump circulation pump 36 is deactivated. This causes the plumbing network 25 to direct the heat transfer fluid 24 only through the solar/air heat exchanger 18 and the ground heat exchanger 12. The fluid enters the solar/air heat exchanger 18 through its bottom, or coldest end. The hot fluid transfer fluid 24 then circulates to the ground heat exchanger 12 where the heat is absorbed by the surrounding earth.

Figure 11:
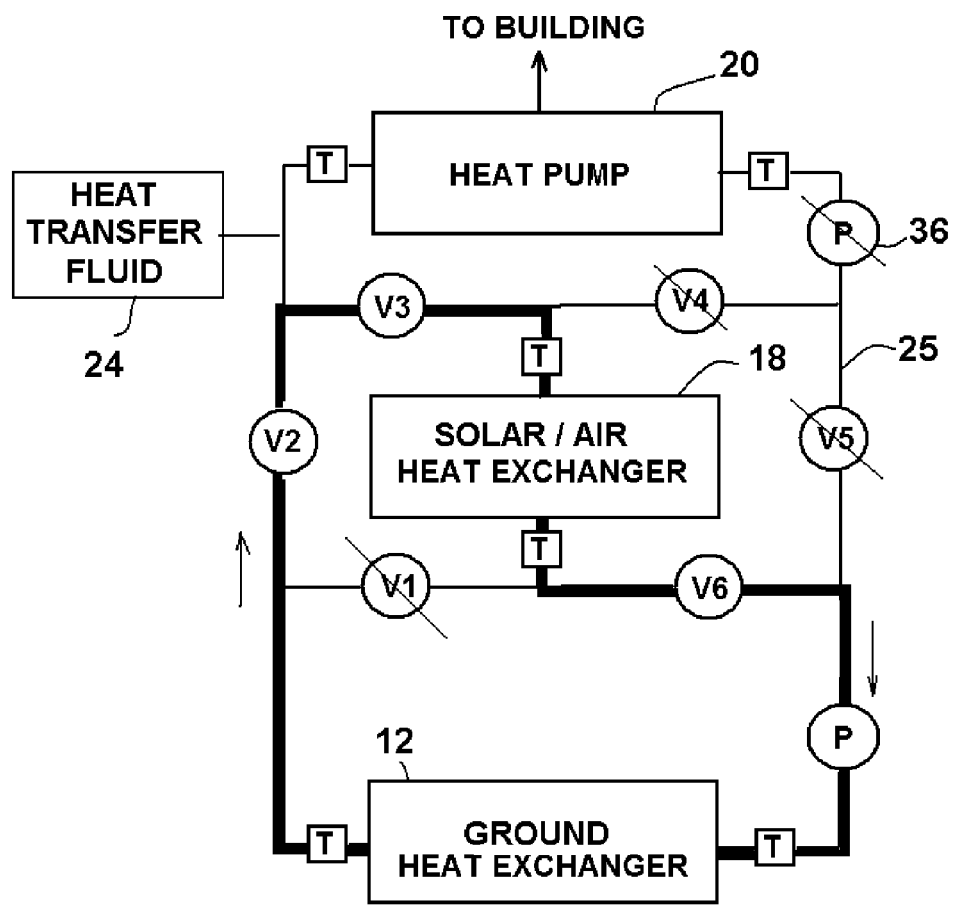
FIG. 11 is a schematic of the exemplary embodiment of FIG. 2 highlighting the flow path of the heat transfer fluid in a ninth operating mode.

Referring to FIG. 11 in conjunction with FIG. 1, a ninth mode of operation is explained. This ninth mode of operation is used when it is desired to cool the ground heat exchanger 12 so that the ground heat exchanger 12 absorbs the heat from the surrounding ground, thereby cooling the surrounding earth. This mode is used when the heat pump 20 is not needed and the systems controller 30 recognizes that the solar/air heat exchanger 18 is colder than the ground heat exchanger 12.

In this mode of operation, valves V1, V4 and V5 are closed. Furthermore, the heat pump circulation pump 36 is deactivated. This causes the plumbing network 25 to direct the heat transfer fluid 24 only through the solar/air heat exchanger 18 and the ground heat exchanger 12. The heat exchange fluid 24 enters the solar/air heat exchanger 18 through its top, or warmest end. The heat transfer fluid 24 then circulates to the ground heat exchanger 12 where the heat transfer fluid 24 absorbs heat from the surrounding earth.

Figure 12:
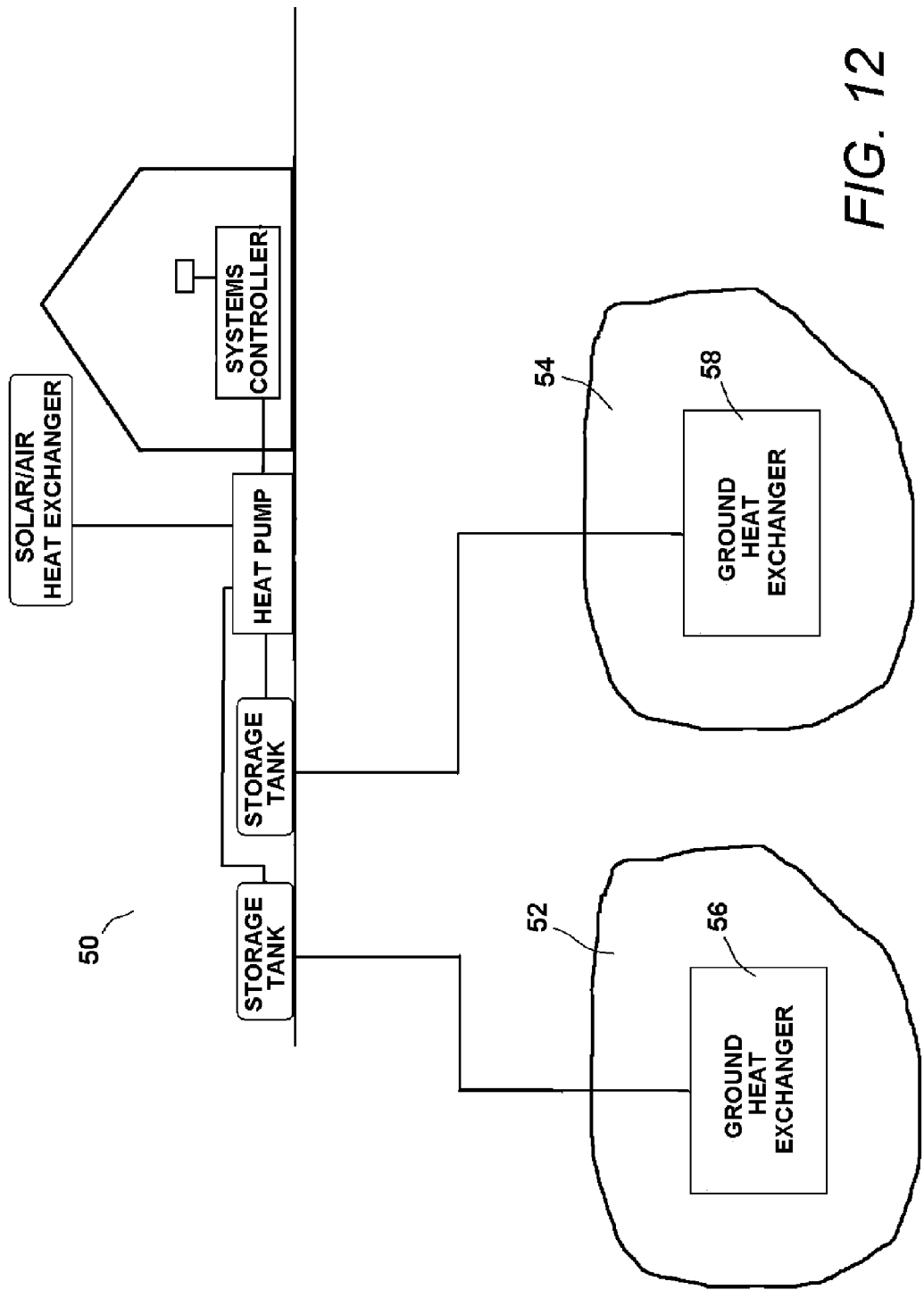
FIG. 12 is a schematic of a second exemplary embodiment of the present invention system, showing primary system components.
Figure 13:
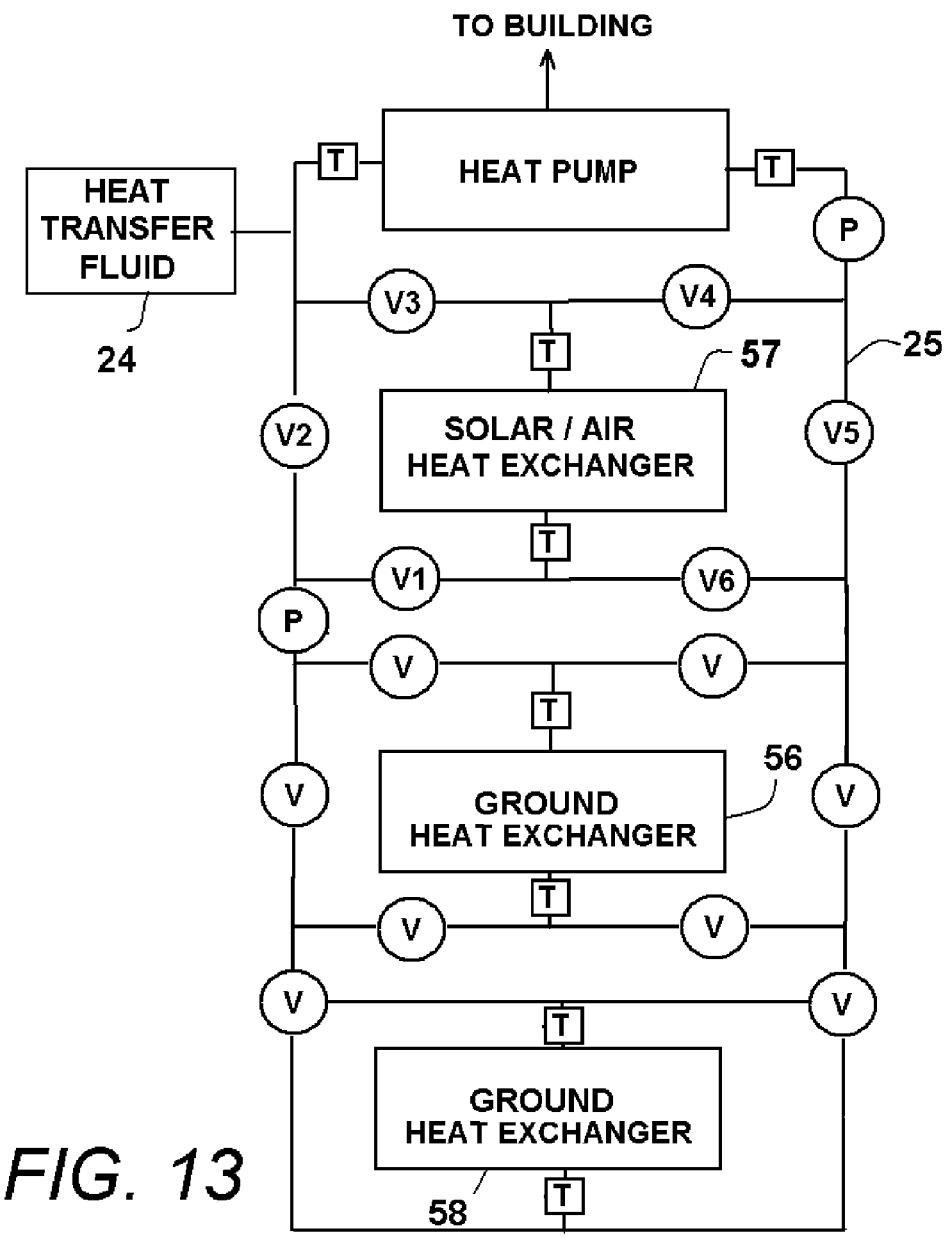
FIG. 13 is a schematic of the exemplary embodiment of FIG. 12 showing the systems that control the flow of a heat transfer fluid between the various system components.

Referring to FIG. 12 in conjunction with FIG. 13, an alternate embodiment of the hybrid multi-source heat pump system 50 is shown. This system 50 has two separate and distinct underground storage areas 52, 54. The system 50 operates most efficiently when a large temperature differential is maintained between a first heat storage area 52 and the second heat storage area 54. Accordingly, it is preferred that the first heat storage area 52 and the second heat storage area 54 be spaced apart or otherwise thermally isolated, therein minimizing any conduction or convection of heat between the two heat storage areas 52, 54. The temperature of the first heat storage area 52 and the second heat storage area 54 are monitored.

For the purposes of discussion, the first heat storage area 52 will be considered the "hot" heat storage area and the second heat storage area 54 shall be considered the "cold" storage area. This assumption is for descriptive purposes only and it will be understood that the hot and cold storage areas can be reversed in the system with minor changes in the controls.

The system 50 has two ground heat exchangers 56, 58 that exchange heat with the two heat storage areas 52, 54, respectively. The system 50 can operate in all of the nine modes of operation previously described. All nine modes of operation described above are available for use with either ground heat exchanger 56, 58 individually, with both exchangers 56, 58 in parallel, or with the two exchangers 56, 58 in series. This opens the door to the possibility of long term (or seasonal) storage of heat in one storage area, and storage of cold in the other storage area.

The valves shown in FIG. 13 allow for not only the individual selection or isolation of the solar/air heat exchanger 57 and the two ground heat exchangers 56, 58, but also the arbitrary reversal of flow direction in each of the heat exchangers. This may or may not be important, depending on the specific design of each of the heat exchangers. If this flow reversal is not needed, the design could use fewer valves than are shown. As discussed above regarding the flow direction reversal in the solar/air heat exchanger 57, a similar need is very likely in the two ground heat exchangers 56, 58.

Even if flow direction is not needed, there still are good reasons to have two heat storage areas with arbitrary series or individual connections. For example, with the assumptions above, area 52 is to be made as warm as possible, and area 54 is to be made as cold as possible. Suppose that we are using the system to bring a maximum of heat into the building on a cold winter night. The system will thus have best efficiency if we use area 52 and heat exchanger 56 to bring fluid into the heat pump. We will assume that the solar/air heat exchanger 57 has a temperature too low to be useful. Even with these assumptions, we still have a choice as to whether the heat pump exit fluid goes directly back to the first heat exchanger 56 or rather have it go to second heat exchanger 58 and then to first heat exchanger 56. The decision for this depends on the relative temperatures of the heat pump exit fluid and the fluid in exchanger 58. If the heat pump exit fluid is colder than the temperature in second exchanger 58, we would use the two heat exchangers 56, 58 in series, so that the fluid is preheated in the second exchanger 58 and then more fully heated in the first heat exchanger 56. This adds to the coldness of area 54, which is beneficial for any future cooling needs. On the other hand, if the heat pump exit fluid is warmer than the temperature in second heat exchanger 58, the series connection would not be used, and the fluid would go from the heat pump directly to first heat exchanger 56. To do otherwise would cause an undesired temperature change in both the underground cold storage area and also in the heat transfer fluid. The same logic applies to the situation where there is a cooling need for the building rather than a heating need. In this case, the fluid going to the heat pump would come from the second exchanger 58, and the choice would be to use or not to use the first exchanger 56 in series.

Regarding the specific form of ground heat exchanger to use in this system, if ground area is a problem the usual choice would be one or more boreholes. Each borehole would use at least one pair of plastic pipes with a connection between the pipes at the bottom of the borehole. The heat transfer fluid would flow down one pipe of a pair and flow up in the other pipe of each pair. The optimization of spacing between boreholes, the design of large arrays, and the interconnection geometry for this is fairly well known. Another possibility for a ground heat exchange method would be an array of horizontal pipes placed in trenches. A third possibility is the use of a rectangular array of pipes placed below a layer of insulation within a few feet of the surface. The insulation would be covered with soil and for new construction it could be placed directly below a building.

Figure 14:
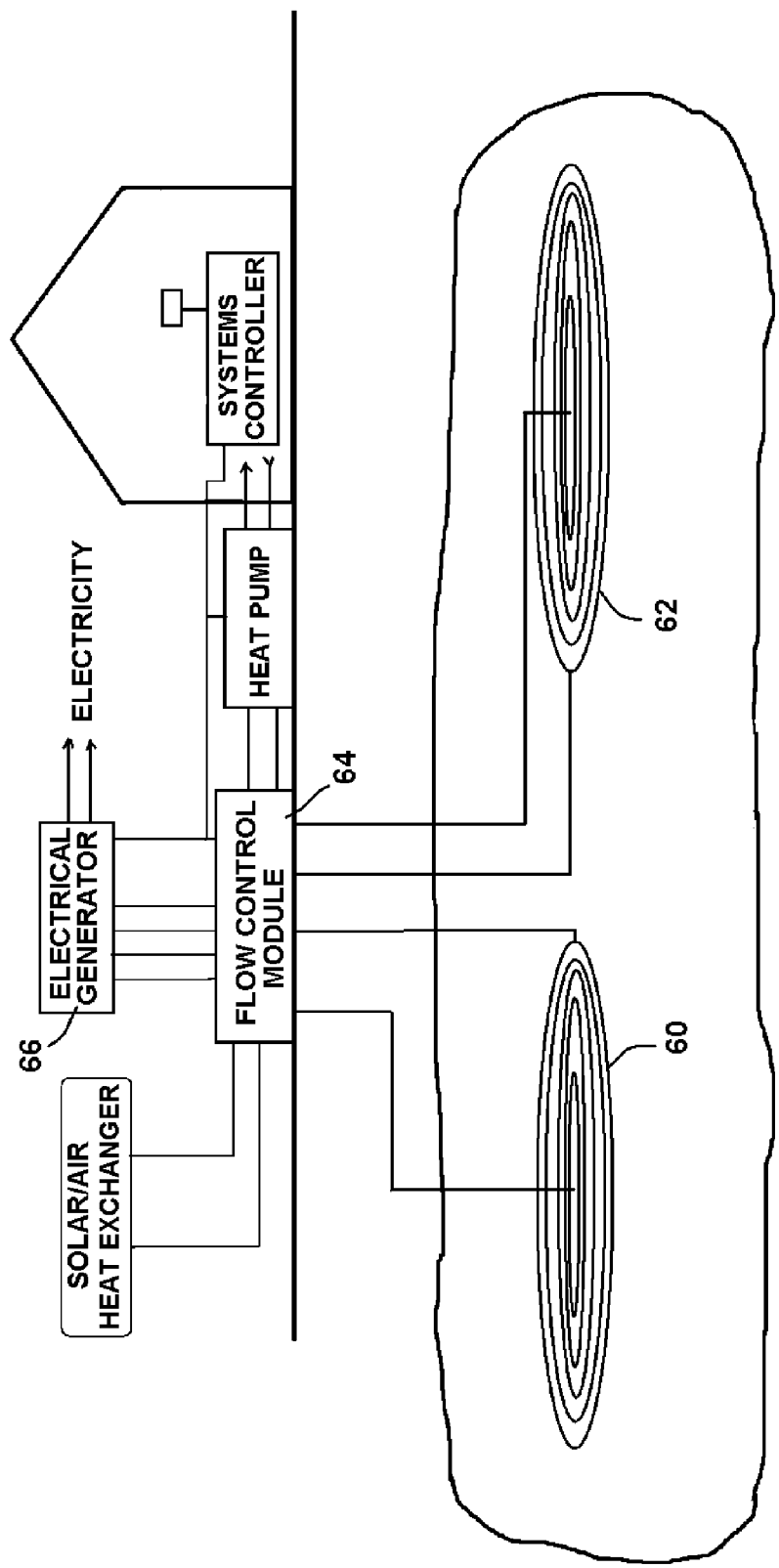
FIG. 14 is a schematic of a third exemplary embodiment of the present invention system, showing primary system components.
Figure 15:
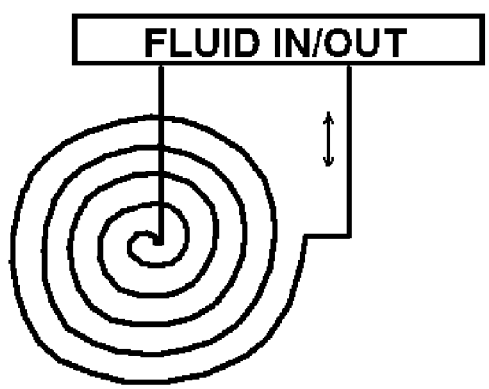
FIG. 15 is a schematic showing the spiral shape of the ground heat exchanger used in the exemplary embodiment of FIG. 14.

FIG. 14 indicates yet another form of ground heat exchange. FIG. 14 is intended to show two independent spiral arrays 60, 62 of pipes with connections at the center and at the perimeter of each array. The configuration of either of the spiral arrays is best shown by referring to FIG. 15. If these arrays 60, 62 are placed just below an insulation layer near the surface of the earth there will be two hemispherical shaped regions of earth that have higher or lower temperature than the nearby deep earth temperature. With this design we will try to maintain the most extreme temperature at the center of each spiral array 60, 62, which is also the center of the isothermal hemispheres.

With the spiral arrays 60, 62, the flow direction becomes very important. When the heat pump is in use, the optimum flow direction is such that fluid flows out from the center of the spiral. On the other hand, if the heat pump is not in use and the storage areas are being charged with more heat or more coldness, the fluid would flow into the center of each spiral. It should be noted that there are choices beyond a single pipe in a single spiral. For example, there could be multiple spiral pipes which are connected together at the center and perimeter, but form multiple flow paths in parallel, such that the resistance to flow is reduced. Also, instead of having pipes in only one horizontal plane, there could be multiple planes each with its own spiral path or paths.

An inspection of FIG. 13 shows that each of the four major blocks has two pipes connecting to it. FIG. 14 shows these same pairs of pipes connecting to each block. FIG. 14 also shows a block titled "Flow Control Module 64". This flow control module 64 is assumed to contain all of the valves and pumps indicated in FIG. 13. This type of design might be simpler in the installation and servicing, however it might lead to longer pipe lengths to do the interconnection. Another possibility indicated in FIG. 14 is an electrical generator block 66. This block 66 would utilize the differential temperatures of fluids in the system to generate electricity at least on a temporary or emergency basis. There are four pipes shown connecting the flow control module 64 to the electrical generator. One pair of pipes is for input and output of hot fluid, and the other pair is for input and output of cold fluid. Although there are many ways for electricity to be generated from temperature differentials, a likely option here would be a Rankine cycle turbine generator similar to what is used for OTEC (Ocean Thermal Energy Conversion) systems. These systems are able to operate with as little as 20 degrees centigrade temperature differential, although higher differentials lead to proportionally higher efficiency.

Another possibility in the systems discussed here is either bypassing or not using the heat pump for heating or cooling the building. If the building is designed with an internal system such as hydronic floor heating and/or chilled beams for cooling it might be possible for the hot and cold fluids in the ground storage regions to directly heat or cool the building. This might be especially true for greenhouses or warehouses where there is a relatively wide allowance for temperature swings. Not having to purchase and maintain a heat pump would be a significant financial benefit.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A hybrid multi-source heat pump system, comprising:
a heat pump;
a solar/air heat exchanger;
a ground heat exchanger;
a plumbing network that hydraulically interconnects said heat pump, said solar/air heat exchanger and said ground heat exchanger, wherein a heat transfer fluid circulates through said plumbing network;
temperature sensors for monitoring temperatures of said heat transfer fluid in said solar/air heat exchanger and said ground heat exchanger;
at least one pump for circulating said heat transfer fluid through said plumbing network;
valves disposed within said plumbing network that can selectively isolate said solar/air heat exchanger, and said ground heat exchanger within said plumbing network;
a systems controller coupled to said temperature sensors, said valves, and said at least one pump, wherein said systems controller operates in multiple modes of operation, wherein said multiple modes of operation include;
a first mode where said solar/air heat exchanger is isolated and said heat transfer fluid circulates only between said heat pump and said ground heat exchanger;
a second mode where said ground heat exchanger is isolated and said heat transfer fluid circulates only between said solar/air heat exchanger and said heat pump;
a third mode of operation where said heat transfer fluid circulates between said solar/air heat exchanger, said ground heat exchanger, and said heat pump, wherein said heat transfer fluid is preheated by said solar/air heat exchanger and more completely heated by said ground heat exchanger;
a fourth mode of operation where said heat transfer fluid circulates between said solar/air heat exchanger, said ground heat exchanger, and said heat pump, wherein said heat transfer fluid is preheated by said ground heat exchanger and more completely heated by said solar/air heat exchanger; and
a fifth mode of operation where said heat pump is isolated and said heat transfer fluid circulates only between said solar/air heat exchanger and said ground heat exchanger.

2. The system according to claim 1, wherein said solar/air heat exchanger includes at least one solar thermal panel.

3. The system according to claim 2, wherein said at least one solar thermal panel is an unglazed solar panel.

4. The system according to claim 1, further including a second ground heat exchanger, wherein said second ground heat exchanger is hydraulically coupled to said plumbing network, and wherein said valves can isolate said second ground heat exchanger within said plumbing network, and wherein said temperature sensors monitor temperatures of said heat transfer fluid in said second ground heat exchanger.

5. The system according to claim 1, wherein said ground heat exchanger has a spiral shape with an extreme temperature at a center of said spiral shape.

6. A hybrid multi-source system, comprising:
a building having an internal system that utilizes heat transfer fluid;
an above-ground heat exchanger;
a first ground heat exchanger;
a plumbing network that hydraulically interconnects said above-ground heat exchanger, said first ground heat exchanger and said internal system, wherein a heat transfer fluid circulates through said plumbing network;
temperature sensors for monitoring temperatures of said heat transfer fluid in said above-ground heat exchanger, said first ground heat exchanger, and said internal system;
at least one pump for circulating said heat transfer fluid through said plumbing network;
valves disposed within said plumbing network that can selectively isolate said above-ground heat exchanger and said first ground heat exchanger within said plumbing network;
a second ground heat exchanger, wherein said second ground heat exchanger is hydraulically coupled to said plumbing network, and wherein said valves can isolate said second ground heat exchanger within said plumbing network, and wherein said temperature sensors monitor temperatures of said heat transfer fluid in said second ground heat exchanger;
a systems controller coupled to said temperature sensors, said valves, and said at least one pump, wherein said systems controller operates in multiple modes of operation to maintain a temperature differential between said first ground heat exchanger and said second ground heat exchanger, wherein said multiple modes of operation include a first operating mode where said heat transfer fluid flows between said above-ground heat exchanger, said first ground heat exchanger, and said internal system, and a second operating mode where said heat transfer fluid circulates only between said above-ground heat exchanger and said first ground heat exchanger; and
a Rankine cycle turbine generator that generates electricity utilizing said temperature differential between said first ground heat exchanger and said second ground heat exchanger.

7. The system according to claim 6, further including at least one storage tank integrated into said plumbing network for storing heat from said heat transfer fluid.

8. The system according to claim 6, wherein said above-ground heat exchanger includes at least one solar thermal panel.

9. The system according to claim 8, wherein said at least one solar thermal panel is an unglazed solar panel.

10. The system according to claim 6, further including a heat pump.

11. A hybrid multi-source heat pump system, comprising:
a heat pump;
a solar/air heat exchanger;
a ground heat exchanger;
a plumbing network that hydraulically interconnects said heat pump, said solar/air heat exchanger and said ground heat exchanger, wherein a heat transfer fluid circulates through said plumbing network;
temperature sensors for monitoring temperatures of said heat transfer fluid in said solar/air heat exchanger and said ground heat exchanger;
at least one pump for circulating said heat transfer fluid through said plumbing network;
valves disposed within said plumbing network that can selectively isolate said solar/air heat exchanger, and said ground heat exchanger within said plumbing network;
a systems controller coupled to said temperature sensors, said valves, and said at least one pump, wherein said systems controller operates in multiple modes of operation, wherein said multiple modes of operation include;

a first mode where said solar/air heat exchanger is isolated and said heat transfer fluid circulates only between said heat pump and said ground heat exchanger;

a second mode where said ground heat exchanger is isolated and said heat transfer fluid circulates only between said solar/air heat exchanger and said heat pump;

a third mode of operation where said heat transfer fluid circulates between said solar/air heat exchanger, said ground heat exchanger, and said heat pump, wherein said heat transfer fluid is initially cooled by said ground heat exchanger and further cooled by said solar/air heat exchanger;

a fourth mode of operation where said heat transfer fluid circulates between said solar/air heat exchanger, said ground heat exchanger, and said heat pump, wherein said heat transfer fluid is initially cooled by said solar/air heat exchanger and further cooled by said ground heat exchanger; and a fifth mode of operation where said heat pump is isolated and said heat transfer fluid circulates only between said solar/air heat exchanger and said ground heat exchanger.

* * * * *